United States Patent [19]

Thompson

[11] Patent Number: 5,130,495

[45] Date of Patent: Jul. 14, 1992

[54] CABLE TERMINATOR

[75] Inventor: Mac A. Thompson, Frankfort, Ill.

[73] Assignee: G & W Electric Company, Blue Island, Ill.

[21] Appl. No.: 646,000

[22] Filed: Jan. 24, 1991

[51] Int. Cl.$^5$ ............................................. H02G 15/02
[52] U.S. Cl. ..................... 174/73.1; 174/167; 174/176; 174/74 R; 174/75 R; 174/75 D; 174/142
[58] Field of Search ................ 174/73.1, 75 R, 75 D, 174/80, 142, 31 R, 31 S, 89, 75 C, 88 C, 88 S, 74 R, 167, 168, 169, 176

[56]  References Cited

U.S. PATENT DOCUMENTS

| 2,651,670 | 9/1953 | Bosworth | 174/73.1 |
|---|---|---|---|
| 3,479,443 | 11/1969 | Mashikian et al. | 174/73 |
| 3,523,157 | 8/1970 | Bauer et al. | 174/142 |
| 3,539,706 | 11/1970 | Buroni et al. | 174/75 D |
| 3,588,319 | 6/1971 | Isogal et al. | 174/143 |
| 3,673,305 | 6/1972 | Mashikian et al. | 174/12 BH |
| 3,674,956 | 7/1972 | Erni | 200/148 A |
| 3,758,699 | 9/1973 | Lusk et al. | 174/19 |
| 3,793,475 | 2/1974 | Yonkers | 174/73.1 |
| 3,796,821 | 3/1974 | Lusk | 174/73.1 |
| 3,827,704 | 8/1974 | Gillemot et al. | 174/65 G X |
| 4,228,318 | 10/1980 | Selsing | 174/73.1 |
| 4,296,274 | 10/1981 | Cookson | 174/142 |
| 4,328,393 | 5/1982 | Goehlich et al. | 174/73.1 |
| 4,458,101 | 7/1984 | Cookson et al. | 174/31 R |
| 4,959,508 | 9/1990 | McGrane | 174/84 C |

FOREIGN PATENT DOCUMENTS 1552890 9/1979 United Kingdom .

OTHER PUBLICATIONS

R. D. Biskup-AT&T, S. D. DeMoss, Technical digest No. 26, Apr. 1972, p. 9.
One-sheet entitled, "Scotchcast Porcelain Termination Kit 5903." This sheet describes assembly instructions for a porcelain termination.
Four-page brochure entitled, "Installation Instructions for E5200 Easy-On Cable Terminator For Copper and Aluminum Conductor Cables." by the Joslyn Manufacturing Company, No. 10535417, dated Nov., 1976.
One-page brochure by Castall, Inc., entitled, "Castall UX-7544 R & I." The brochure describes a two-part polyurethane potting encapsulating and casting compound.

Primary Examiner—Leo P. Picard
Assistant Examiner—Hyung S. Sough
Attorney, Agent, or Firm—Fitch, Even, Tabin & Flannery

[57] ABSTRACT

A cable termination assembly for terminating a high voltage current-carrying conductor includes an outer porcelain housing and an inner polymeric liner of low durometer, cast in the housing before insertion of the cable. The liner is bonded to the housing wall to prevent air voids. A metal base member amy be employed and may include an upstanding shielding collar extending part way into the housing and being joined thereto by the cast liner.

3 Claims, 4 Drawing Sheets

CABLE TERMINATOR

BACKGROUND OF THE INVENTION

1. Field of the Invention

The present invention pertains to electric cable terminations, and in particular, to terminations for electric cables used for electric power distribution.

2. Description of the Related Art

Electric cables having concentric neutral conductors and embedded wire conductors are becoming increasingly popular. For example, such cables are used in direct burial, Underground Residential Distribution (URD) applications. These cables are typically operated at thousands of volts, and hence, care must be taken in managing or controlling the electrical stress at points where the cable is terminated for coupling to electrical components such as switchgear units, for example.

Such cables typically include electrical shielding surrounding the central current-carrying conductor. For example, cables can include a concentric semi-conducting jacket, concentric metallic foil wrapping, or concentrically wrapped, discrete drain wires. The various arrangements of semi-conducting and conducting layers surrounding the central current-carrying conductor control the electric stress and induced electrical fields surrounding the central conductor, features which are important for direct burial and the like applications.

Cable terminations typically require removal of the various dielectric, semi-conducting and conductive shield layers surrounding the central current-carrying conductor with the various semi-conducting and conducting surrounding layers being appropriately connected to the electrical equipment involved. For example, a porcelain termination kit is available from the Minnesota Mining and Manufacturing Company as SCOTCHCAST 5903. The kit, which is field-installed, provides termination for concentric neutral URD cable having a semi-conducting jacket surrounding the cable insulation, disposed within a helical wrap of much smaller gauge concentric wires, commonly referred to as drain wires. The various layers of the concentric neutral cable are removed in the field following closely dimensions laid out in the installation instructions accompanying each kit.

For example, the drain wires are pulled back to expose a predetermined length of the cable semi-conductive jacket. A bottom end cap is inserted over the semi-conductive jacket and forms a lower seal therewith. The semi-conductive jacket is cut back at a predetermined distance from the cable tip, as is the cable insulation, exposing a predetermined length of the bared current-carrying conductor. A series of different tapes are wound about defined sections of the prepared cable end. Vinyl plastic electrical tape, semi-conducting tape, and stress control tape, for example, are employed.

A porcelain insulator is disposed about the prepared cable end and a mounting ring is slid underneath the porcelain insulator before its insertion in the bottom end cap. A top cap includes a recess for receiving the current-carrying conductor, and includes a threaded hole for receiving a pour spout. An elastomeric compound commercially available as SCOTCHCAST 2100 is poured through the top cap to fill the interior of the porcelain insulator. The hole is plugged with a threaded sealing plug. The entire assembly of the termination, including pouring of the elastomeric compound is performed in the field and is therefore subject to different temperature and humidity conditions, for example.

It has been found during development of the present invention, that the first 20 hours or so of the curing of an elastomeric compound is particularly critical to the subsequent performance of that cast compound in a high voltage electrical insulation system. As those skilled in the art will recognize, it is difficult to maintain carefully controlled conditions in the field, let alone for an extended period of time such as a 20-hour period subsequent to the casting of the elastomeric compound. As described, the cable is inserted in the porcelain insulator before the elastomeric compound is poured and thus, the resulting cured compound structure takes on the diameter of the cable portions disposed within the porcelain insulator. Experience has shown that elastomeric fillers applied in the field do not offer good performance at low temperatures and that due to different coefficients of thermal expansion, a gap between the filler and the cable might result.

A terminator commercially available from Joslyn Manufacturing Company, Stock Item #E5200, provides a porcelain termination with a stress relief cone which is loaded inside the porcelain insulator at the lower end thereof, and an elastomer sleeve is inserted between the prepared cable end and the porcelain insulator bore. In order to eliminate air gaps between the sleeve and porcelain and the sleeve and cable insulation, a compression spring of considerable strength is loaded into the top of the porcelain insulator, surrounding the upper end of the prepared cable end. An upper cap is secured to the porcelain insulator to maintain the spring in compression. A relatively large number of components and a higher level of expertise are required for assembly. Further, neither the stress relief cone nor the elastomer sleeve bond to the porcelain insulator and thus, air voids at the interface between these members and the porcelain insulator may ultimately lead to dielectric failure.

A porcelain termination sold by the G & W Electric Company, assignee of the present invention, is commercially available under the trade designation "Slip-On Terminator." This termination employs a porcelain insulator which slips over a prepared cable end. A length of sponge tubing is inserted between the prepared cable end and the inner bore of the porcelain insulator, and also in a mounting base which is disposed below the insulator, also surrounding the prepared cable end. The sponge does not bond to the inner bore of the porcelain insulator and greater retention strength at low temperatures is desired.

As mentioned above, it is important to control the electrical stress at the prepared cable end. Of particular interest is the control of electrical stress at abrupt changes in the cable shielding system. One area of concern is the point where the semi-conducting layer is cut away, thus creating a discontinuity in the electrical field surrounding the cable. Heretofore, measures have been taken to directly bond metallic base mountings at the bottom end of a cable termination, so as to position the ground plane at a portion of the cable termination which is designed to handle the electrical stress. It is desirable to provide a ground plane at the bottom of the cable termination which extends through the various termination components and which adapts to thermal changes in cable size, to eliminate interstices that may form between the various termination components, particularly the cable and a metallic support base.

Further improvements in metallic support bases are desirable to ensure hermetic sealing between the metallic base and the porcelain insulator resting thereon. To be commercially attractive, such hermetic sealing should be easy to install and economical to fabricate. Heretofore, oil-filled terminations have been provided to address many of the above concerns. For a variety of reasons, which have long been recognized in the industry, it is desirable to eliminate liquid-filled terminations.

SUMMARY OF THE INVENTION

It is an object according to the present invention to provide an improved dry (i.e., not oil-filled) cable termination which is economically constructed with a minimal amount of labor, from a minimum number of inexpensive parts and which maintains a tight grip on the cable over the expected range of cable operating temperatures and environmental temperatures.

Another object according to the present invention is to provide a cable termination of the above-described type which is fabricated in a factory, under controlled conditions and which is quickly and easily installed in the field with a minimum amount of expertise and without requiring special tools.

A further object of the present invention is to provide a cable termination having a metallic base member which forms a ground plane passing through a precisely located medial portion of the ceramic insulator to provide efficient electrical stress control.

Another object according to the present invention is to provide an electric termination having a dielectric liner which maintains an interference fit and void-free engagement with the cable despite temperature changes.

Yet another object according to the present invention is to provide a cable termination in which air pockets and interstices internal to the porcelain bushing are avoided, thus precluding ionization, especially in regions of high electric field.

These and other objects of the present invention which will become apparent from studying the appended description and drawings are provided in a cable termination apparatus, for terminating a current carrying conductor, comprising:

a rigid housing having an inner bore wall defining an inner bore;

a substantially incompressible, but nonetheless deformable, flexible or resilient one-piece hollow liner of cast polymeric material defining an inner conductor-receiving bore of smaller size than the insulating layer on the conductor, the conductor-receiving bore having an enlarged entrance end; and said liner in continuous intimate contact with the inner bore wall of said housing so as to substantially eliminate voids at the interface between said liner and said inner bore wall.

In another embodiment of cable termination apparatus according to the present invention, a metallic base member is joined to the bottom of ceramic insulator. The base member has an upstanding collar which extends partway into the ceramic insulator bore. The elastomeric filler is poured between the base member and the cable and porcelain insulator to eliminate air voids, and to provide an effective ground plane without requiring direct contact between the semi-conductive jacket of the cable and the metallic base member. It has been found that the electrical bonding of the semi-conductive jacket is adequate to place the upper end of the semi-conductive jacket at ground potential, that is, the same potential as the metallic base member, without requiring direct contact between the two.

BRIEF DESCRIPTION OF THE DRAWINGS

In the drawings, wherein like elements are referenced alike.

DETAILED DESCRIPTION OF THE PREFERRED EMBODIMENTS

Figure 1:
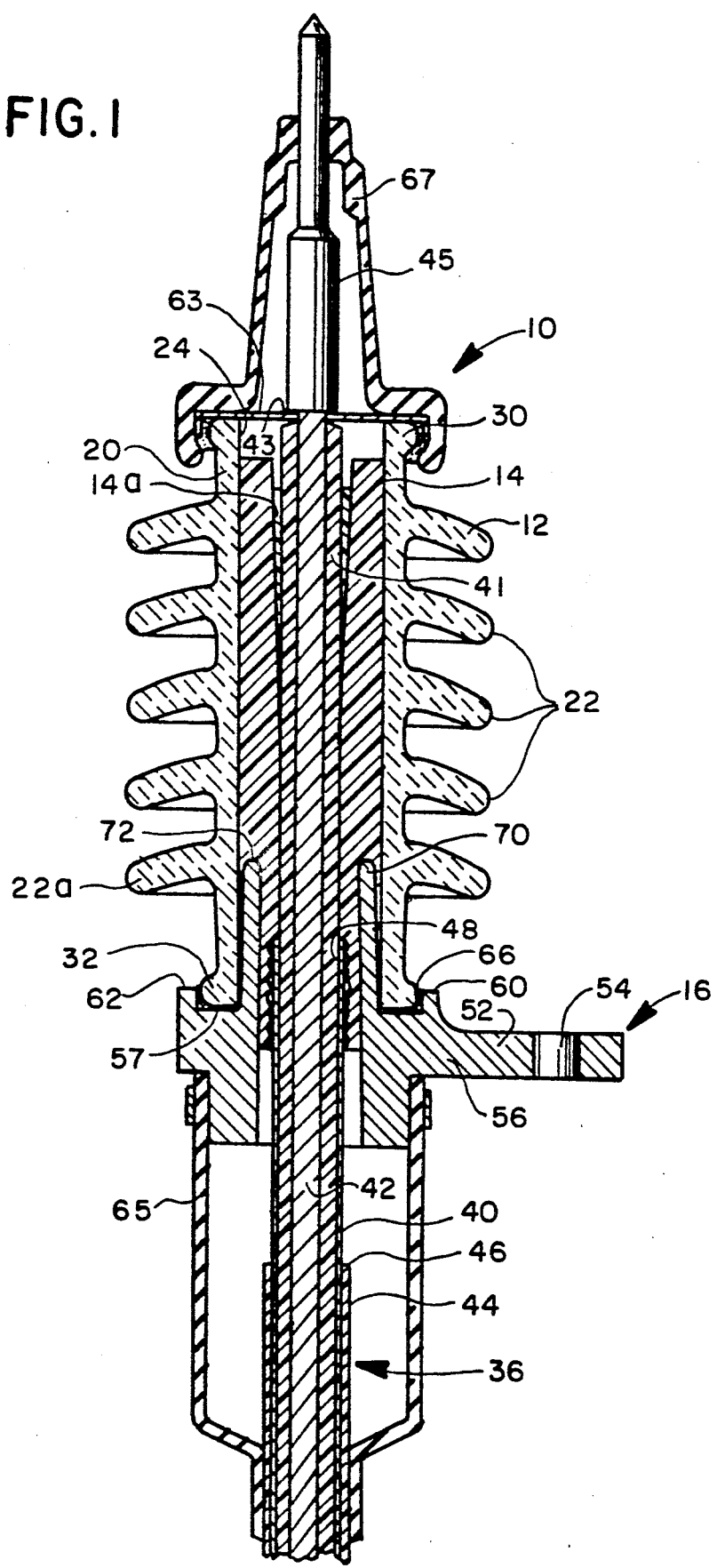
FIG. 1 is a cross-sectional elevational view of a portion of a cable termination assembly illustrating principles according to the present invention.
Figure 2:
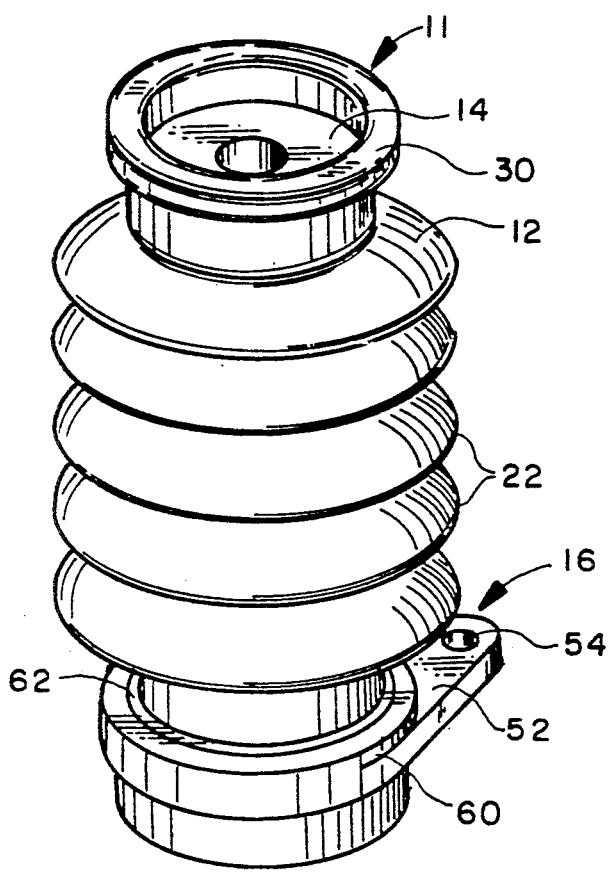
FIG. 2 is a perspective view of a termination assembly with the top cap removed.

Referring now to the drawings, and initially to FIGS. 1 and 2, a cable termination assembly constructed according to principles of the present invention is generally indicated at 10. As will be seen herein, the cable termination is a "dry" termination, that is, not oil-filled and is fitted on a prepared cable end without requiring special tools or expertise. A cable termination subassembly 11 is illustrated in FIG. 2. Essentially, the cable termination subassembly 11 is comprised of a porcelain housing 12 and a dielectric liner or filler 14. The liner 14 is cast in the porcelain housing at the factory, under controlled conditions, and is shipped to the field, fully assembled, for installation as required. The subassembly 11 preferably includes a conductive base 16.

Referring now to FIG. 1, the completed cable termination assembly 10 includes a porcelain housing generally indicated at 12 defining a central bore, a dielectric liner 14 of substantially incompressible, but nonetheless deformable, resilient or flexible material, and a metallic support base generally indicated at 16. The housing 12 is preferably of conventional porcelain construction, comprising a generally tubular housing wall 20, and a series of skirts 22, outwardly extending from the wall. The inner surface 24 of housing wall 20 as shown is cylindrical, but can have other shapes, if desired. Housing wall 20 includes upper and lower generally annular end members 30, 32.

FIG. 1 shows a completed terminator assembly with a high voltage electrical cable generally indicated at 36, installed therein. Cable 36 may be of the concentric neutral or embedded wire type, for example, as is commonly used in electrical distribution systems for Underground Residential Distribution (URD) applications. In the preferred embodiment illustrated in the figures, cable 36 has a semiconductor layer 40 disposed around an insulating layer 41 covering a central metallic conductor 42. The cable 36 further includes an outer dielectric jacket 44.

As can be seen in FIG. 1, the multi-layer cable 36 has been prepared for assembly with the cable termination 10. For example, the outer dielectric jacket 44 has an upper free end 46 disposed near the bottom of the termination, and the semi-conductive layer 40 has an upper free end 48 forming a step with respect to insulating layer 41. The conductor 42 and insulating layer 41 together comprise a conductor means or cable inner layer which is inserted in the termination, as will be seen herein. As those skilled in the art will appreciate, termination 10 allows the central current-carrying conductor 42 to be bared at 43, and to extend beyond the electrical shielding system of the cable, which otherwise controls the electrical stress and electrical fields present when the conductor is energized.

According to an important aspect of the present invention, housing wall 20 is filled with an elastomer material which is cast in place, within housing wall 20, prior to insertion of cable 36. The generally tubular liner 14 is produced by this casting. The elastomer material of liner 14, when cured, preferably comprises a substantially incompressible but nonetheless deformable, resilient material which maintains its cured shape over the operating range of cable temperatures, so as to follow the cable as the cable expands and contracts. The following are examples of suitable elastomer materials: low durometer polyurethane, low durometer silicones and flexibilized epoxies. The preferred material is a low durometer polyurethane commercially available as a potting and encapsulating compound under the trade designation of CASTALL UX-7544, available from CASTALL, Inc., of East Weymouth, Mass. Those skilled in the art will be able to readily determine other suitable elastomer materials, based upon teachings of the present invention.

As one feature of the present invention, the elastomer material, when cast within housing wall 20, forms a bonding with the inner wall surface 24. Preferably, the bonding is substantially continuous throughout the interface between the liner 14 and the wall surface 24 so as to prevent pockets or other interstices which might break down electrically under the high electric fields set up by the current-carrying conductor 42. At a minimum, the bonding eliminates large size voids, large numbers of linearly aligned smaller size voids, and large numbers of closely spaced smaller size voids. Such would, of course, degrade the insulation value of the termination and if breakdown were to occur, might significantly shorten the useful life of the termination assembly.

As mentioned above, electrical terminations have been proposed and are in use today, which have elastomeric compounds poured into the space between a porcelain insulator and an electrical cable previously inserted therein. Such elastomeric compounds are poured in the field, under field conditions. In contrast, the liner 14, according to the present invention, is cast within housing wall 20 prior to insertion of an electrical cable therein. The liner 14 is cast to form an inner bore, and when cured, has a neck portion of size slightly less than the size of the current-carrying cable, a feature not possible with elastomers cast in the field to surround a cable previously inserted in an insulator housing.

With the precast liner of the present invention, a certain amount of insertion force must be exerted on the cable inner layer to install the cable in the termination assembly. However, the liner material is flexible and deformable without sacrificing substantial incompressibility, shape retention and resilience, and thus, an intimate void-free engagement of the liner throughout the length of the conductor is assured and minor irregularities in the outer surface of insulating layer 41 may be accommodated by liner 14, assuring an intimate engagement which is not compromised over the useful life of the termination assembly. Such engagement is important to prevent electrical breakdown and also to prevent intrusion of contamination within the termination assembly.

Figure 3:
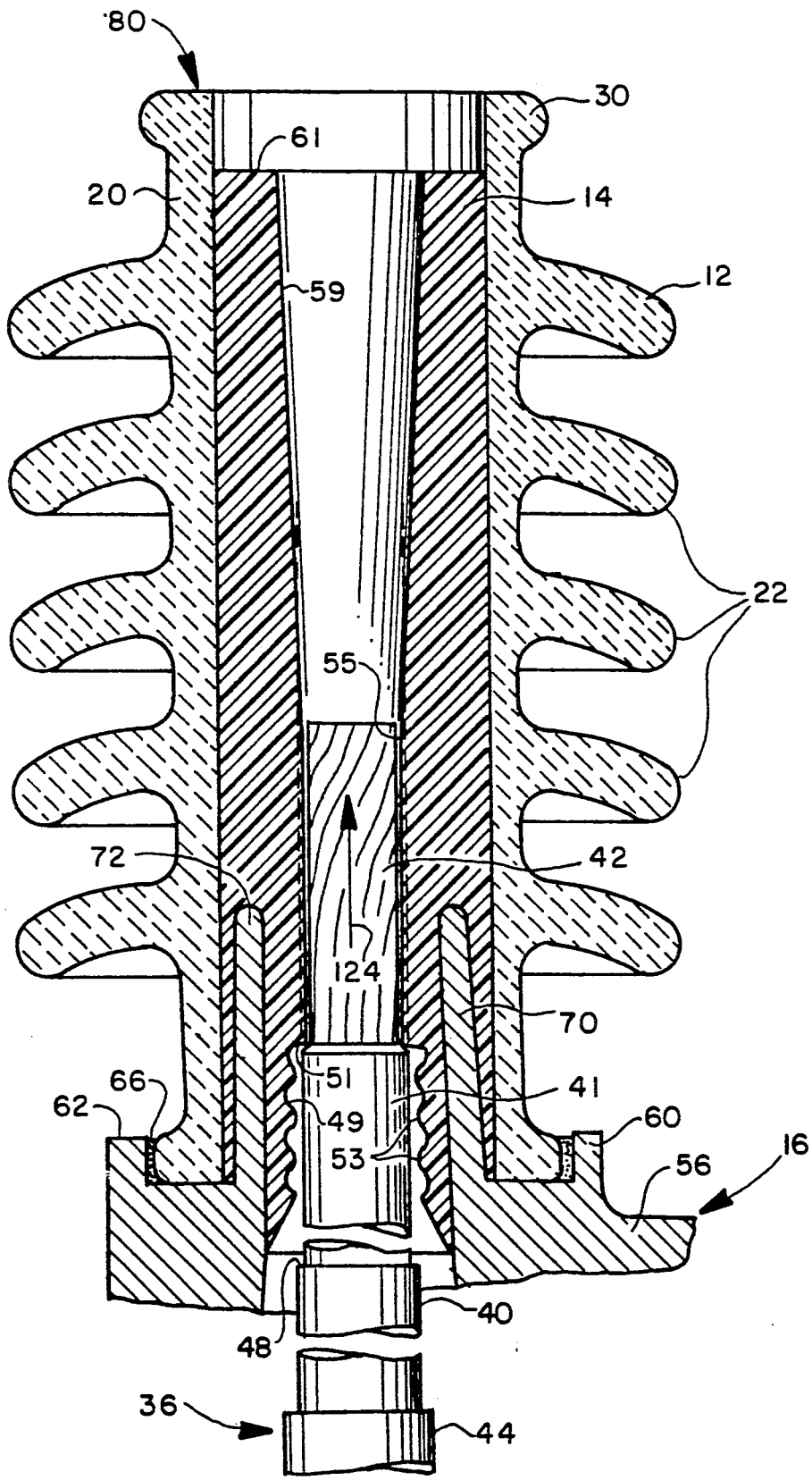
FIGS. 3 and 4 are partial cross-sectional elevational views thereof, shown on an enlarged scale.

Provision is made when casting liner 14 to accommodate the increased size of the upper end of semi-conductive layer 40. Referring to FIG. 3, a pocket 49 is formed with an upper wall 51. The pocket 49 is generally cylindrical to reduce push-out of the cable. The pocket 49 forms an enlarged end of the cable-receiving bore to aid in cable insertion. In the preferred embodiment, a plurality of annular ribs 53 provide an elastomeric seal with the cable, and in particular, the semiconductor layer 40 thereof. The ribs 53 are formed such that their root portions are of generally the same size as the semiconductor layer, with the protruding portions of the ribs being flattened when the cable is inserted. A dielectric grease may be employed when inserting the cable to displace any trapped air in pocket 49. The cable is inserted until the free end of the semiconductor layer engages wall 51.

As can be seen in FIG. 3, a generally cylindrical neck portion 55 is located above pocket 49. The neck portion 55 is undersized relative to the cable insulating layer 41. An upwardly expanding tapered portion 59 is located above neck portion 55. The tapered portion has an upper free end 61, which is recessed below the upper surface of housing wall 20. A protective cap 63 (see FIG. 1), preferably of stainless steel, prevents water and airborne contaminants from settling in this recessed area, the upper cap being particularly desirable when the termination assembly is installed outdoors. A compression terminal 45 is crimped onto conductor 42 after the tip of the conductor is pushed through cap 63. A conductive rubber sealing boot 67 covers the upper end of the assembly and a non-conductive rubber sealing boot 65 covers the lower end, as will be seen herein.

According to another aspect of the present invention, a base support generally indicated at 16 is provided to support the cable and the termination 10. The base 16 includes a lower, generally horizontal plate member 52 having an aperture 54 for receiving a screw fastener to provide a convenient mounting for the termination to a supporting structure. The base 16 includes an annular portion 56 underlying the insulator housing so as to engage the lower enlarged annular end 32 thereof. Annular portion 56 is preferably merged with plate 52. As those skilled in the art will appreciate, the joint 57 between the bottom end of the insulator housing and the base 16 may experience intrusion of moisture and contaminants which might migrate inwardly toward the center of the termination assembly, over a prolonged period of time.

Accordingly, it is desirable to eliminate such intrusion at the joint between the housing and base and according to one aspect of the present invention, an upstanding annular collar 60 is provided to surround the joint between the housing and base member. The collar 60 has an upper surface 62 extending above the bottom of the insulator housing, preferably extending to the top of the enlarged annular end 32 of the housing. Collar 60 forms a recess into which a sealant 66 is cast. The sealant may be of any suitable material, but preferably bonds to the base 16 and the housing 12, so as to provide a hermetic seal. Preferably, the sealant will maintain the bond with the insulator housing and base, despite temperature variations causing expansion and contraction associated with the thermal coefficients of expansion of economical housing and base materials.

Figure 5:
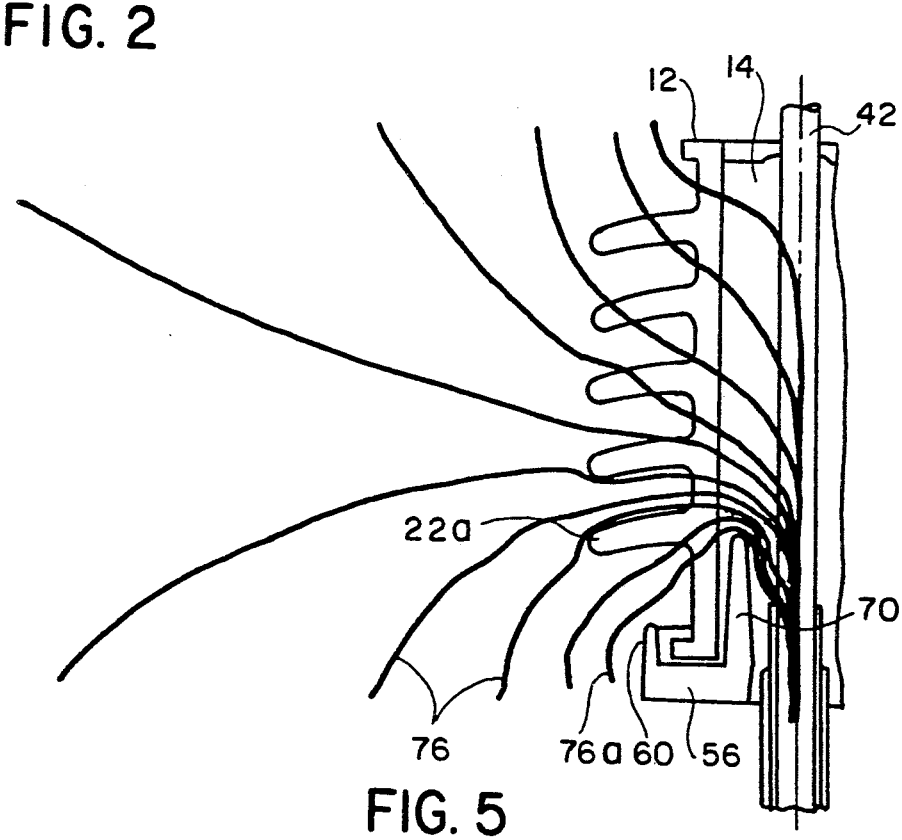
FIG. 5 is an electrical field plot overlaid on a schematic outline of a portion of the cross-sectional view of FIG. 1.

According to another aspect of the present invention, the base 16 includes an optional upstanding shield 70 extending part way into housing wall 20. The shield 70 is preferably provided as an integral portion of base 16, which as mentioned, is made of a conductive, preferably metallic material. The base 16 is electrically grounded, and thus, the upstanding shield 70 is at ground potential. The shield 70 extends above the upper end 48 of semi-conductive layer 40 sufficiently to minimize the electrical stresses at upper end 48. In the preferred embodiment, the upper end 72 of shield 70 is located adjacent an enlarged thickness portion of housing wall 20, herein the lowermost skirt 22a. As can be seen in the electric field plot of FIG. 5, the electric field lines 76 emanating from the free end of the semi-conductive layer are concentrated at the increased thickness portion of housing wall 20, which is better able to withstand the electrical stress than thinner portions of the housing. The shield free end 72 can be located elsewhere, if desired, away from a skirt member. Thus, the relatively expensive porcelain material can be reduced in thickness with the optional upstanding shield according to the present invention. Also, quite importantly, as can be seen in FIG. 5, the joint between the insulator housing and base is effectively shielded from electrical stress.

If desired, the upstanding shield 70 can be installed after liner 14 is cured. However, the factory casting of liner 14 made possible with the present invention provides significant advantages if an electrical shield member or a simpler base without an electric shield member is desired for the termination assembly. In the preferred embodiment, the base member 16 is installed prior to casting of liner 14, the liner material flowing to surround the shield 70, and to provide an intimate void-free seal between the shield, housing and cable, and optionally the annular support portion of base 16.

Contrary to a commonly held belief in this art, the electric shield 70 has been found to function very well as an electric shield, even though it is separated from semi-conductive layer 40 by a thickness of dielectric liner 14. Of course, the semi-conductive shield 40 must be bonded to a circuit element which is at ground potential, according to currently accepted practices in the industry. Thus, the semi-conductive layer 40 and shield 70 are both at ground potential and the innermost electric field line 76a plotted in FIG. 5, represents a line of approximately zero potential, i.e., the receding ground plane, when conductor 42 is energized.

As mentioned above, the neck portion 55 is undersized relative to the cable insulating layer 41. The cable end is prepared as explained above, with various outer layers removed at appropriate points along the cable length. For example, the semiconductor layer 40 is cut back from the cable free end at a distance which ensures the cut end 48 engages wall 51 of pocket 49 (see FIG. 3), thus providing a convenient tactile indication that desired orientation relative to shield 70 has been achieved.

Figure 4:
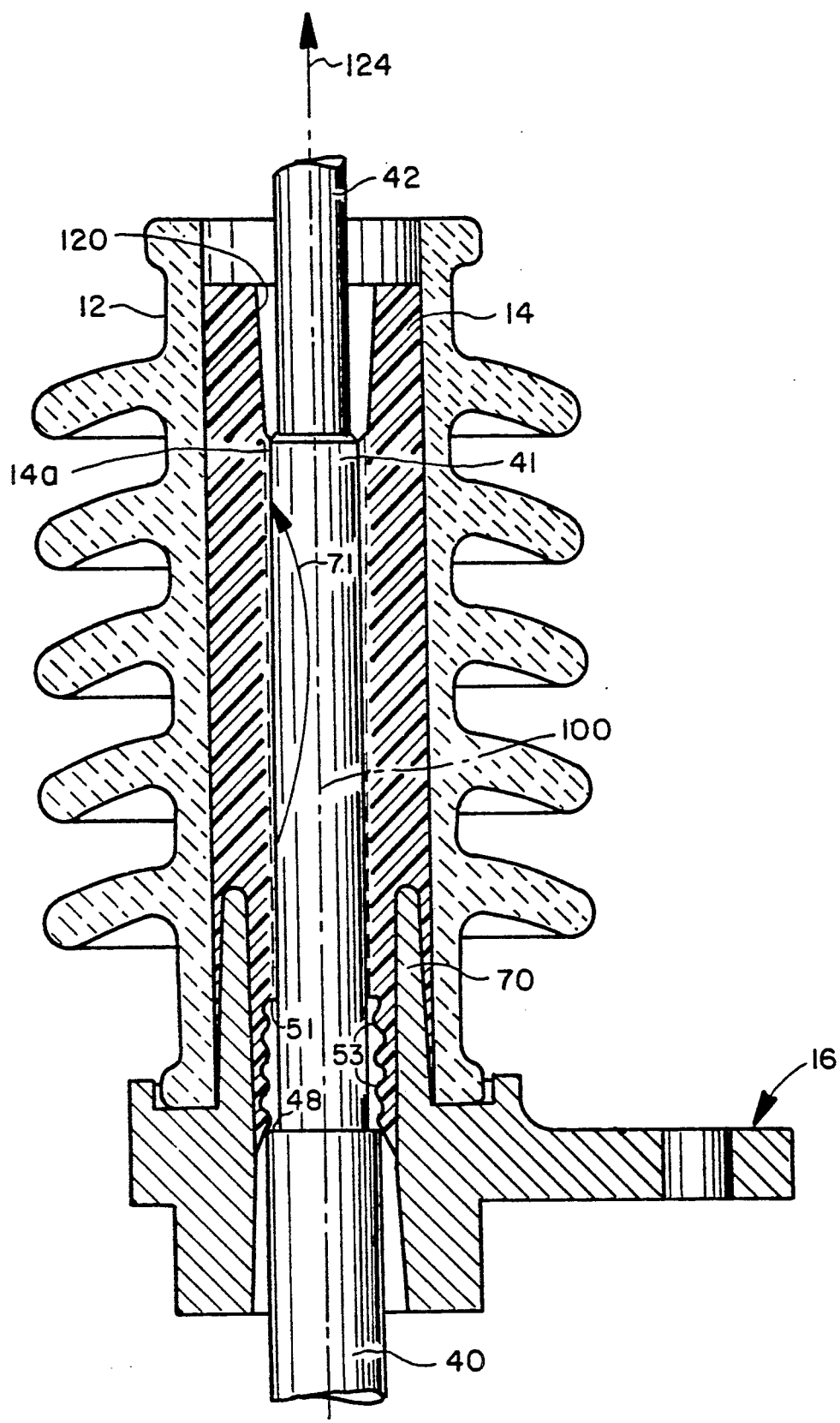

The inner layer of the cable, comprising the conductor 42 and surrounding insulating layer 41, is inserted in the lower, enlarged end of the liner bore and is pushed through the neck portion 55, displacing liner material 14a from the neck into the tapered portion 59 as indicated by arrow 71 of FIG. 4. The liner material is incompressible and flexible and exhibits sufficient compression set resistance, so as to retain its cured shape despite deformation, and hence the cable is securely gripped by liner 14 despite changes in temperature and variations in conductor size. Thus, an interference fit can be ensured under all expected cable operating conditions. The liner is soft, but still tear resistant and easily follows motion of the cable surface, maintaining a "dry" void-free engagement therewith, as the cable expands and contracts with temperature changes.

Other cable constructions having different layered arrangements may also be used with the present invention, and the conductor means pushed through the liner bore need not necessarily be comprised of a conductor and single dielectric layer.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A cable termination apparatus for terminating a cable including current carrying conductor means having an outer cable insulation means, comprising:
    a rigid housing having an inner bore wall defining an inner bore;
    a substantially incompressible, but nonetheless deformable flexible on-piece hollow liner of cast polymeric material having a liner bore wall defining an inner conductor-receiving bore of smaller size than the cable insulation means, the liner bore wall having an enlarged entrance end and an upper end which is enlarged to accommodate liner material displaced toward the upper end of the liner bore wall when the conductor means is inserted in the entrance end of the liner bore wall; and
    said liner being in continuous intimate contact with the inner bore wall of said housing so as to substantially eliminate voids at the interface between said liner and said inner bore wall.

2. The apparatus of claim 1 wherein the enlarged end of the liner bore defines sealing ribs for sealing engagement with the cable.

3. The apparatus of claim 1 wherein the upper end of said liner bore wall has an upwardly expanding taper.

* * * * *

UNITED STATES PATENT AND TRADEMARK OFFICE
CERTIFICATE OF CORRECTION

PATENT NO. : 5,130,495
DATED : July 14, 1992
INVENTOR(S) : Mac A. Thompson

It is certified that error appears in the above-identified patent and that said Letters Patent is hereby corrected as shown below:

On the title page of the patent, under the heading entitled "ABSTRACT", on line 6, change "amy" to read --may--.

In Column 8, line 40 (Claim 1, line 7), change "on-piece" to read --one-piece--.

Signed and Sealed this

Seventh Day of September, 1993

*Attest:*

BRUCE LEHMAN

*Attesting Officer*  Commissioner of Patents and Trademarks